United States Patent [19]
Brenes

[11] Patent Number: 5,791,632
[45] Date of Patent: Aug. 11, 1998

[54] QUICK RELEASE SLIDE LOCK FOR VACUUM VALVE

[76] Inventor: Arthur Brenes, 5855 Jensen Rd., Castro Valley, Calif. 94546

[21] Appl. No.: 892,470

[22] Filed: Jul. 14, 1997

[51] Int. Cl.⁶ .................................................. F16K 3/00
[52] U.S. Cl. ................................. 251/329; 251/367
[58] Field of Search ............................. 251/326, 329, 251/367

[56] References Cited

U.S. PATENT DOCUMENTS

| | | | |
|---|---|---|---|
| 4,223,868 | 9/1980 | Humes et al. | 251/326 |
| 4,251,054 | 2/1981 | Baas | 251/329 X |
| 4,917,143 | 4/1990 | Grooms | 251/367 X |
| 5,597,184 | 1/1997 | Brenes et al. | 285/24 |

*Primary Examiner*—John Fox
*Attorney, Agent, or Firm*—Julian Caplan; Flehr Hohbach Test Albritton & Herbert LLP

[57] ABSTRACT

A quick release clamp mechanism (10) including a pair of slide lock plates (12, 14) for engaging a series of guide screws (32) extending down from a bonnet or end plate (16) and through openings in a valve body flange (18). Toggle clamps (40) releasably engage one of the guide screws (32') and thereby can slide the slide lock plates (12, 14) by pivoting of a toggle lever (76). Sliding of slide lock plates (12, 14) causes a neck down region of openings (34) in plates (12, 14) to capture the heads of guide screws (32) and clamp bonnet plate (16) to valve body flange (18).

16 Claims, 6 Drawing Sheets

QUICK RELEASE SLIDE LOCK FOR VACUUM VALVE

BACKGROUND OF THE INVENTION

1. Field of the Invention.

The present invention pertains to vacuum valves for applied processing systems and, more particularly, to a quick release clamp mechanism for connecting and disconnecting the bonnet and flange of gate valves.

2. Related Art

Current gate valve designs include a valve housing that is usually an elongated rectangular structure large enough to enclose a circular gate valve as it moves between open and closed positions. An actuator assembly is mounted at one end of the housing and is connected to the gate valve for achieving linear movement of the gate valve. The valve housing is sealed from atmosphere and operates at pressures approaching 15 lbs. vacuum. Suitable seals are provided to create an air-tight enclosure. The number of moving parts and components that engage and make contact with each other is kept to a minimum in order to minimize particulate build-up within the valve housing.

It is generally necessary to perform maintenance work on such gate valve designs in order to replace worn or damaged seals and clean the interior of the housing. To gain access to the interior components of a gate valve, a removable bonnet plate is provided, which allows for removal of the actuator and gate valve as a unified assembly. The bonnet plate is secured to the valve housing by means of a series of nuts and bolts or other threaded attachment devices. Since gate valves operate at significant pressure differentials, it is necessary that the connection between the bonnet plate and the valve housing be a secure connection, to prevent atmospheric air from infiltrating the valve housing. Threaded bolt connections provide the necessary secure connection for maintaining the vacuum seal of the valve housing.

A problem with nut and bolt connections is that they are tedious and time consuming to disconnect and reconnect. Also, due to the configurations used in many applied processing systems, the location and accessibility of the valve housing can be problematical. It is an object of the present invention to allow for quick and easy removal of the bonnet plate, even for systems where access is limited.

My prior U.S. Pat. No. 5,597,184 discloses a quick release clamp for bonnet and flange gate valves that comprises a C-shaped wrap-around clamp which is releasable by means of a toggle mechanism. The present invention is an improvement, much the same as my prior art '184 patent, upon the tedious and time consuming design of threaded fasteners.

SUMMARY OF THE INVENTION

Briefly described, the vacuum valve of the present invention comprises a valve housing defining a valve chamber, with the valve chamber having an opening therein for providing access to the vacuum chamber, a valve plate movable within the valve chamber from a first, open position away from the opening to a second, closed position wherein the valve plate closes the opening to the vacuum chamber, and an actuator for moving the valve plate between its open and closed positions. The valve housing includes a removable end plate or bonnet plate to which the actuator and valve plate are secured, so that removal of the end plate in an upward or outward direction separates the actuator and valve plate from the valve housing. The valve housing also includes an end plate engaging member, such as a valve body flange. A clamp mechanism couples to one of the end plate and end plate engaging member, and has a first position allowing separation of the end plate from the end plate engaging member and a second position that securely holds the end plate to the end plate engaging member in a sealed manner. The clamp mechanism is movable between its first and second positions in a direction transverse the direction of removal of the end plate.

The clamp mechanism includes a lever that moves the clamp mechanism between its first and second positions. The clamp mechanism also includes a series of guide screws mounted to one of the end plate and the end plate engaging member and extending through openings in the other of said end plate and end plate engaging member, and a slide plate that is movable in a plane transverse to the guide screws. The slide plate has a first position that permits separation of the end plate from the end plate engaging member and a second position that securely fastens the end plate to the end plate engaging member.

The slide plate includes elongated openings, one for each guide screw, and a guide screw engaging protrusion, and at least one guide screw includes a shoulder adapted to engage a guide screw engaging protrusion when the slide plate is in a second position and thereby prevent movement of the guide screw in a direction along its central axis.

The guide screw engaging protrusion includes a cam surface for progressively engaging the shoulder of the guide screw and clamping the end plate and end plate engaging member together. The slide plate is mounted on the valve housing in a manner permitting sliding movement of the slide plate between its first and second positions. The cam surface progressively engages the shoulder of the guide screw as the slide plate moves from its first position to its second position.

These features as well as other features and objects and advantages of the present invention will become apparent from the following detailed description when read in conjunction with the drawings and the claims and the abstract, which are all considered part of the invention.

BRIEF DESCRIPTION OF THE DRAWINGS

The accompanying drawings, which are incorporated in and form a part of this specification, illustrate embodiments of the invention and, together with the description serve to explain the principles of the invention.

DETAILED DESCRIPTION OF THE PREFERRED EMBODIMENT

Reference will now be made in detail to the preferred embodiments of the invention, examples of which are illustrated in the accompanying drawings. While the invention will be described in conjunction with the preferred embodiments, it will be understood that they are not intended to limit the invention to those embodiments. On the contrary, the invention is intended to cover alternatives, modifications and equivalents, which may be included within the spirit and scope of the invention as defined by the appended claims.

Figure 1:
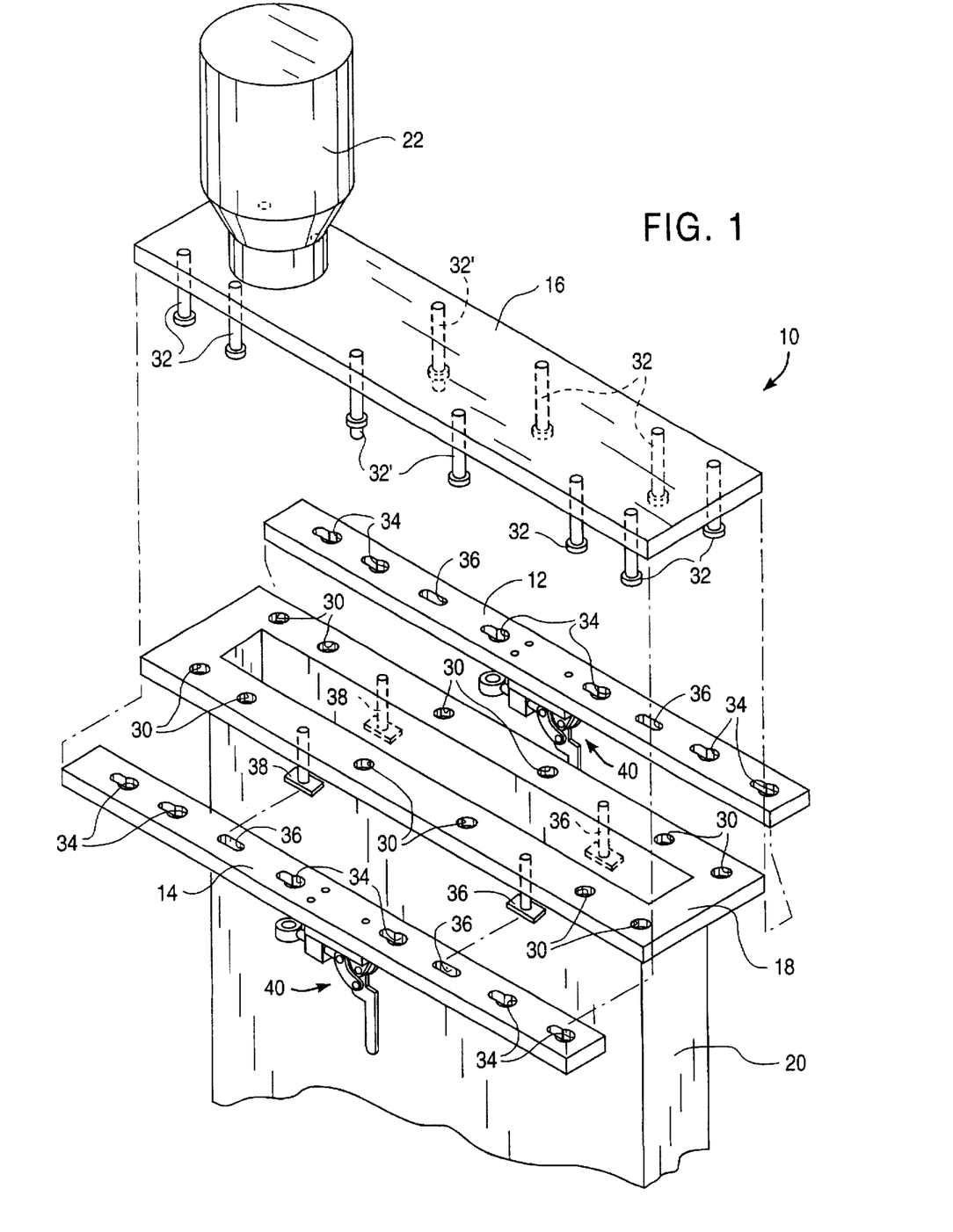
FIG. 1 is an exploded pictorial view of the quick release slide lock assembly of the present invention.

Referring to FIG. 1, the quick release slide lock assembly 10 of the present invention includes a pair of slide lock plates 12, 14, which function to secure by clamping force a bonnet plate or end plate 16 to a valve body upper flange 18, and thereby seal the top end of a gate valve 20. For clarity, the seals between body flange 18 and bonnet plate 16 have not been illustrated.

An actuator 22 is mounted on bonnet plate 16 and is coupled to a valve gate (not shown) within valve body 20. Actuator 22 typically includes a piston rod that extends downwardly from the actuator housing and into valve body 20, to connect with the valve gate. Again, for clarity, the piston rod and connecting linkage to the valve gate are not shown. Additionally, pneumatic controls are typically mounted on bonnet plate 16, but these also are not shown. A person or ordinary skill in the art should appreciate the design and operation of actuator 22, the pneumatic controls and the linkage connecting the actuator to the valve gate.

Body flange 18 includes a series of twelve openings 30, six on each side of valve body 20 and six for each slide lock plate 12, 14. Likewise, bonnet plate 16 includes twelve guide screws 32, some of which are shown in phantom and two of each are not shown due to illustration of actuator 22. Each guide screw 32 is threaded into bonnet plate 16. The positioning of guide screws 32 and openings 30 are such that the guide screws 32 extend down through openings 30 when bonnet plate 16 is mounted onto body flange 18. Slide lock plates 12, 14 each include six openings 34, for a total of twelve slide lock plate openings, which also receive guide screws 32 when bonnet plate 16 is mounted onto body flange 18.

Each slide lock plate 12, 14 also includes a pair of short slot openings 36, which receive shoulder screws 38 that are thread mounted to valve body flange 18 and extend downwardly therefrom. As discussed later with reference to FIGS. 8–10, the heads of shoulder screws 38 support each slide lock plate 12, 14 in a manner permitting longitudinal sliding movement of the plates.

Each slide lock plate also includes a toggle clamp 40, which functions to slide its corresponding slide lock plate longitudinally as well as to apply a clamping force on guide screws 32, which clamps bonnet plate 16 to valve body flange 18.

Figure 2:
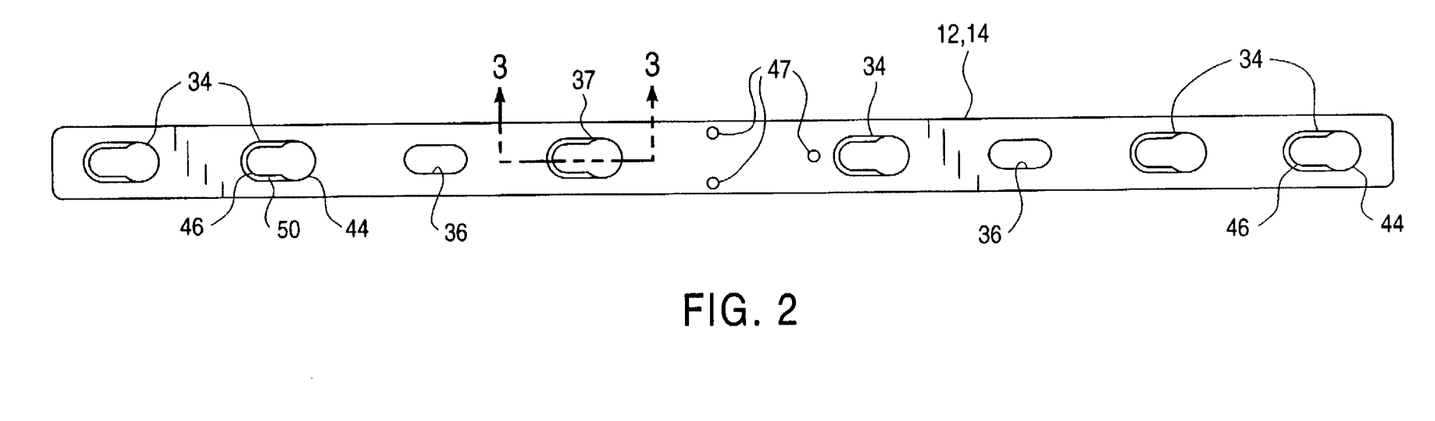
FIG. 2 is plan view of one of the slide lock plates of Fig. 1.
Figure 3:
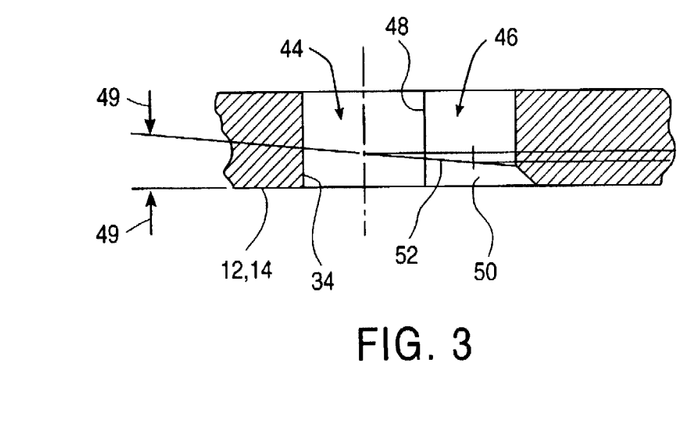
FIG. 3 is sectional view, taken along the line A—A of FIG. 2.

FIGS. 2 and 3 show the design of openings 34 and 36 in one of the slide lock plates 12, 14. Both slide lock plates and their corresponding toggle clamps are identical. Each opening 34 is generally oblong circular in shape and includes a wide diameter half 44 and a neck down small diameter half 46. The wide diameter half 44 is wide enough to pass the head of a guide screw 32 therethrough, while the neck down region is not. In FIG. 3, the line delineating the wide and small diameter regions is denoted by reference 48.

Opening 34 also includes a beveled region 50, which consists of a bevel cut that has a progressively diminishing depth so as to form a ramp or cam surface 52. During clamping, the head of a guide screw engages cam surface 52 and is pulled thereby as a slide lock plate is slid longitudinally, in order to clamp the bonnet plate down onto the valve body flange. The slope of cam surface 52, depicted by arrows 49, is approximately 5 degrees, which creates sufficient difference in depth of bevel region 50 to clamp the bonnet plate onto the valve body flange. When the gate valve is operational, the vacuum pressure within the valve housing augments the clamping force of the slide lock plates, which together create an adequate seal at the bonnet plate. Each slide lock plate 12, 14 also includes a set of three screw holes 47 for securing a toggle clamp to the slide lock plate.

Figure 4:
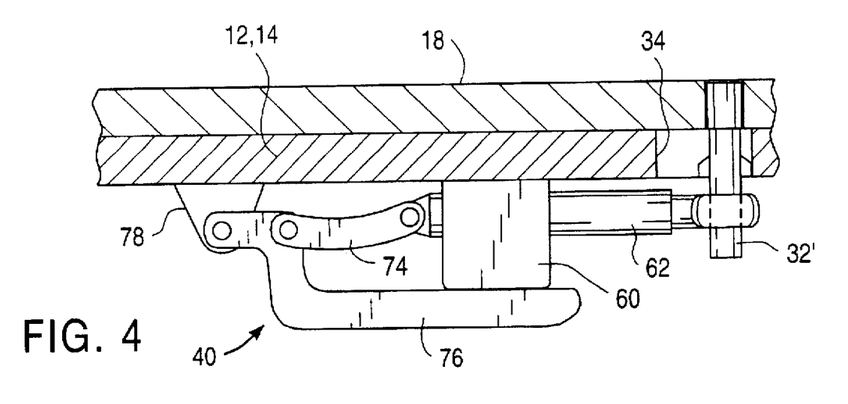
FIG. 4 is a reverse angle side elevational view of the toggle clamp of FIG. 1, shown in a closed, clamped position.
Figures 5, 6, 7:
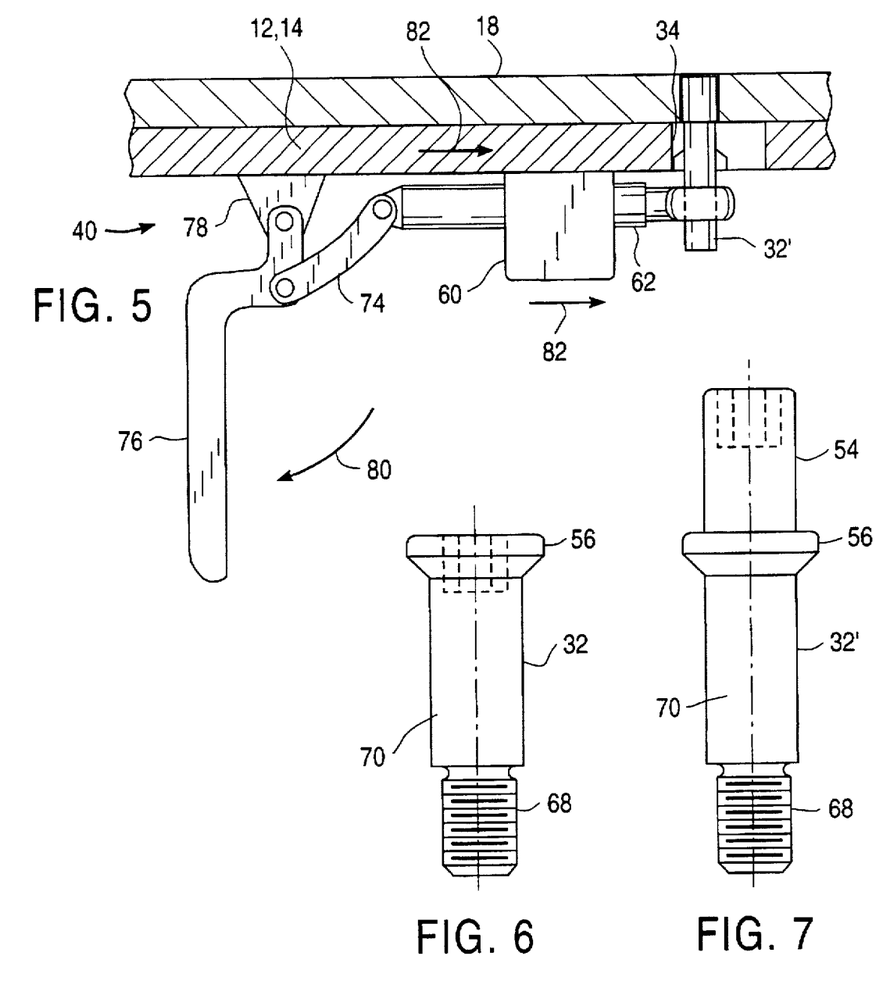
FIG. 5 is a reverse angle side elevational view of the toggle clamp of FIG. 1, shown in an open, unclamped position.
FIG. 6 is an elevational view of one of the guide screws of FIG. 1.
FIG. 7 is an elevational view of one of the clamp screws of FIG. 1.

FIGS. 4 and 5 show the design of a toggle clamp 40. Slide lock plate 12, 14 is slidably positioned underneath valve body flange 18 and is held thereto by the shoulder screws (not shown). Toggle clamp 40 includes a guide block 60 that is fixedly mounted to slide lock plate 12, 14 and includes a smooth bore opening for slidably receiving push arm 62. Push arm 62 includes a transverse smooth bore opening at one end which releasably receives a guide screw 32'. As shown in FIGS. 6 and 7, guide screw 32' is like the other guide screws 32 except that it includes an upper lug projection 54, which projects beyond a screw head 56, as shown in FIG. 7. Lug 54 slidably inserts into the transverse opening at one end of push arm 62 when the bonnet plate is mounted onto the valve body flange 18. Lug 54 releases from push arm 62 when the bonnet plate is removed from the valve body flange, as discussed with reference to FIG. 10.

As shown in FIGS. 6 and 7, each guide screw 32, 32' includes a threaded portion 68 for threadably connecting to the bonnet plate and a smooth body section 70, which extends through the valve body flange and a slide lock plate opening. The guide screw heads 56 are captured within the neck down region of the slide lock plate openings and are cammed by the bevel surface of the openings to apply a clamping force on the bonnet plate. There is only one guide screw 32' with a lug projection 54 on each side of the bonnet plate, and it interconnects with a toggle clamp 40.

Referring back to FIGS. 4 and 5, toggle clamp 40 further includes a short pivot link 74, which pivotally connects to the opposite end of push arm 62 from guide screw 32'. Pivot link 74, in turn, pivotally connects with a toggle lever 76, which is pivotally connected to a clevis mount 78 mounted to slide lock plate 12, 14. As shown in FIG. 5, pivoting of toggle lever 76, in the direction of arrow 80, causes clevis mount 78 and slide lock plate 12, 14 to slide in the direction of arrows 82, which shifts the position of guide screw 32' within slide lock opening 34. Pivoting toggle lever 76 back to its position of FIG. 4 repositions the slide lock plate 12, 14 and positions guide screw 32' at the other end of opening 34.

Figure 8:
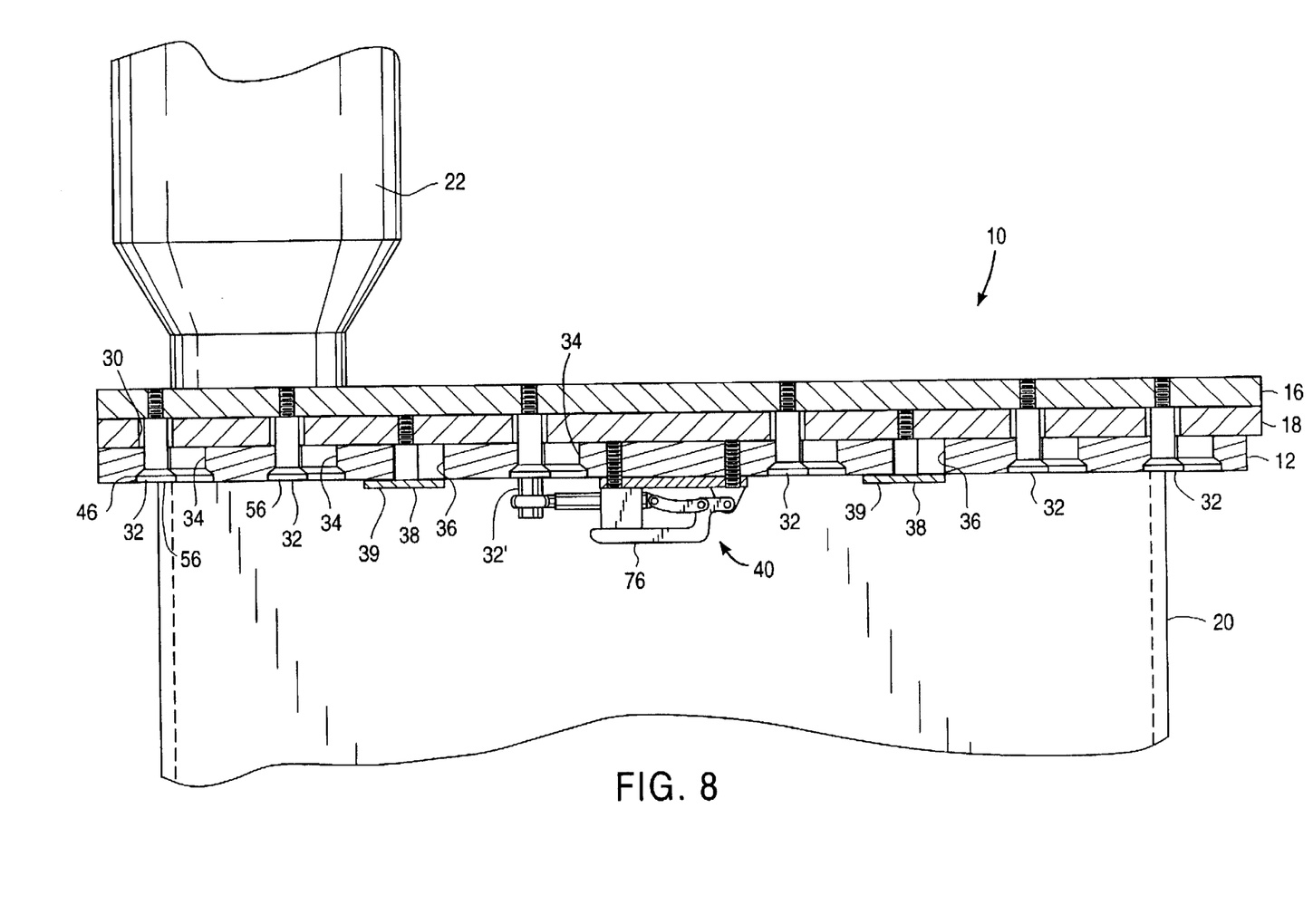
FIG. 8 is a sectional view of the slide lock plate, valve body flange, and bonnet plate, showing the toggle clamp in a closed, clamped position.

Referring to FIG. 8, in an assembled and clamped configuration, guide screws 32 extend down through openings 30 in valve body flange 18 and into openings 34 of slide lock plate 12 (or 14), wherein their screw heads 56 are captured within the neck down region 46 of openings 34. Shoulder screws 38 extend through slot openings 36 and their large screw heads 39 capture the slide lock plate 12 and slidably hold the plate against valve body flange 18. Toggle lever 76 is pivoted to a closed, clamped position, which positions slide lock plate 12 to the right as shown in the figure, and thereby positions guide screws 32 within the neck down regions 46. While within the neck down regions, screw heads 56 engage the cam surface of openings 34, which pulls downward on the guide screws, thereby clamping bonnet plate 16 to valve body flange 18.

Figure 9:
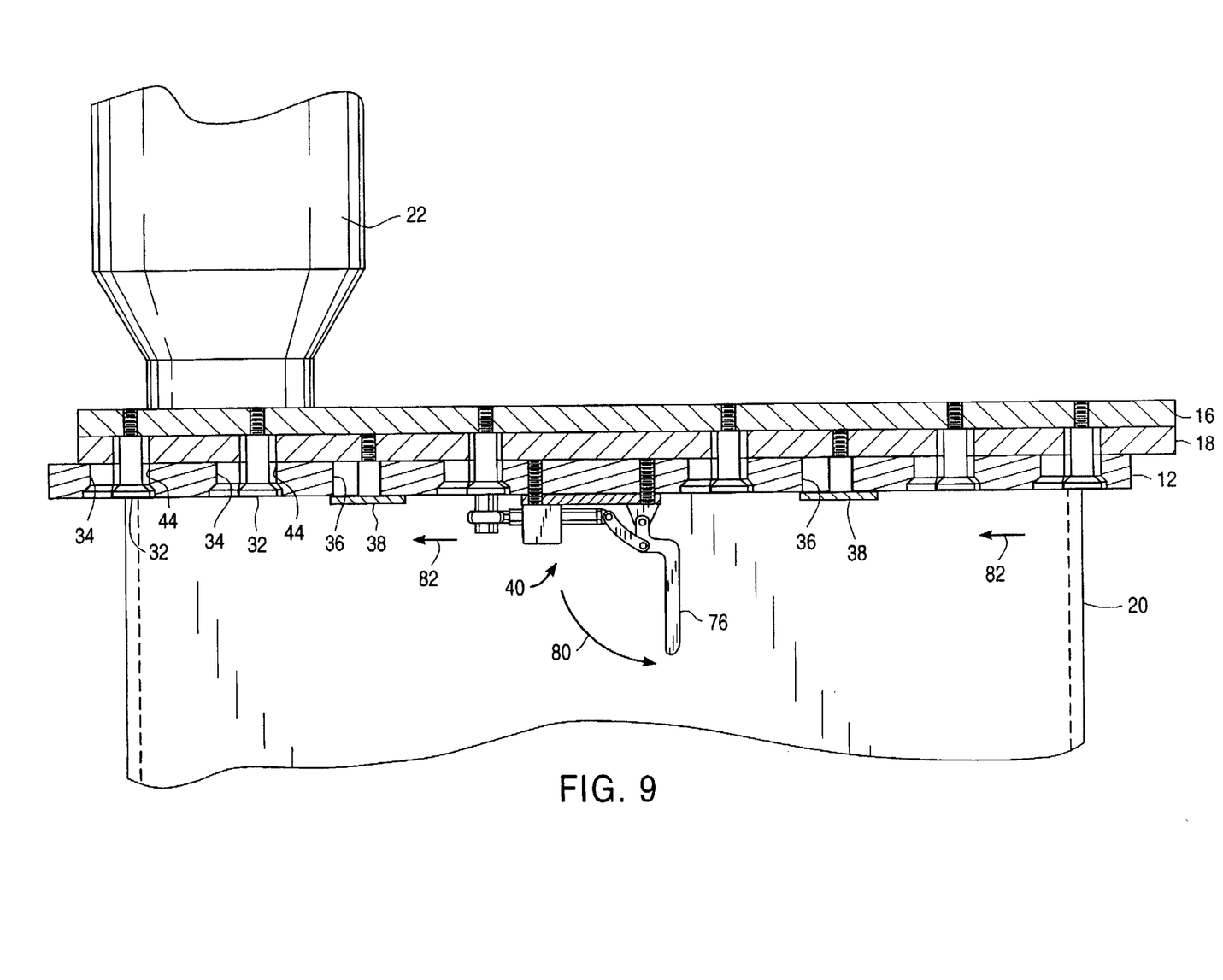
FIG. 9 is a view like FIG. 8, showing the toggle clamp in an open, unclamped position.

Referring to FIG. 9, to release bonnet plate 16 from valve body flange 18, toggle lever 76 is pivoted as shown by arrow 80, which causes slide lock plate 12 to slide to the left as shown by arrow 82. This repositions the screw heads 56 of guide screws 32, 32' into the wide diameter half 44 of openings 34, which are wide enough to permit vertical movement of the guide screws 32, 32' through the openings. Repositioning the guide screws 32, 32' also releases the screw heads 56 from the cam surface of openings 34 and thus releases clamping pressure on the guide screws.

Figure 10:
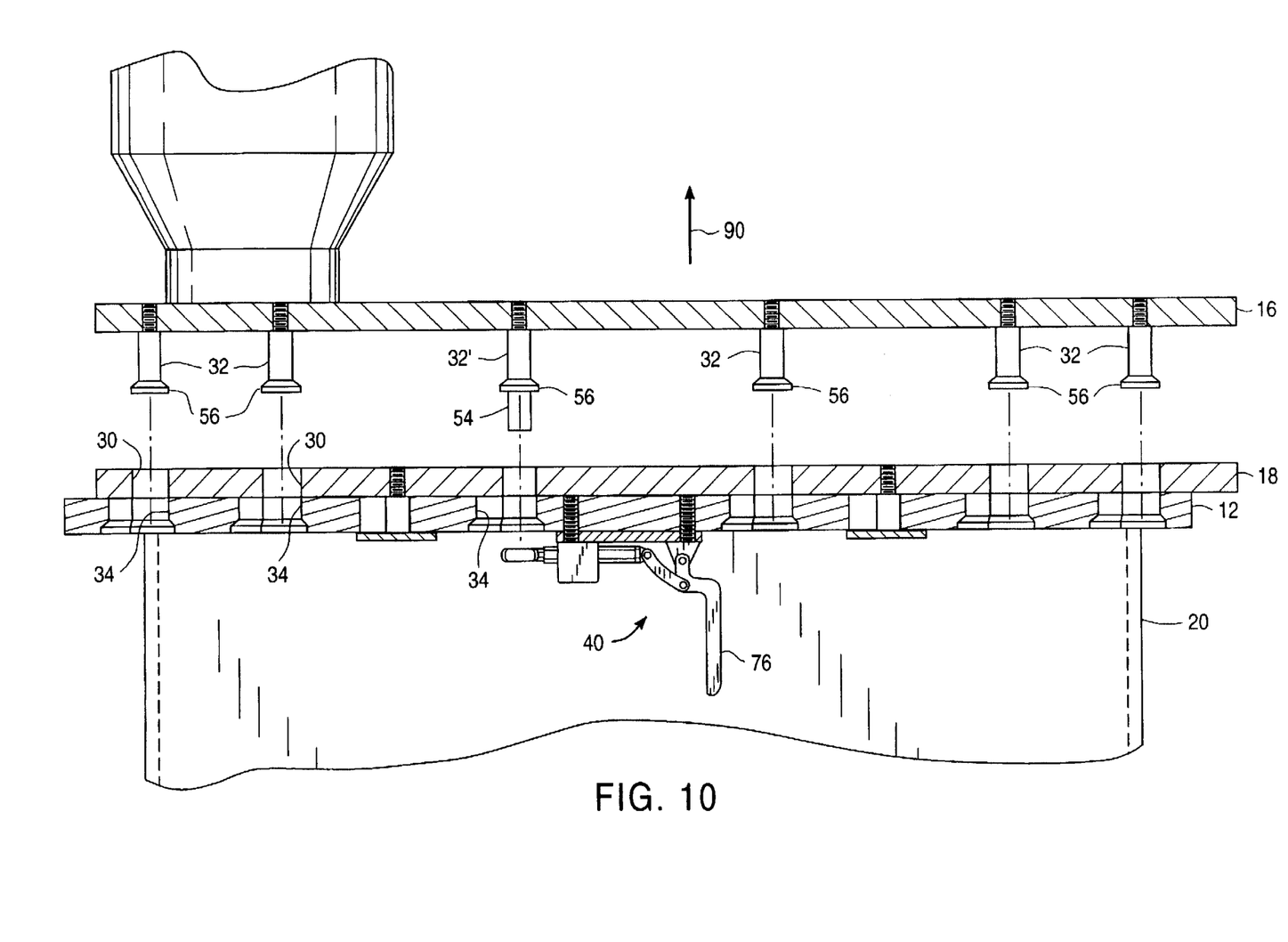
FIG. 10 is a view like FIGS. 8 and 9, showing the bonnet plate removed from the valve body flange.

As shown in FIG. 10, with toggle lever 76 open and slide lock plate 12 slid to the left, the screw heads 56 can pass through aligned openings 34, 30, allowing bonnet plate 16 to be removed from valve body flange 18. As the bonnet plate 16 is removed, the lug 54 of guide screw 32' releases from pull arm 62. Of course, when bonnet plate 16 is removed, the valve gate and connecting linkage also are removed with the bonnet plate. However, these components have not been illustrated.

The slide lock plates 12, 14 have been illustrated as attached beneath the valve body flange with the guide screws mounted to and extending from the bonnet plate, through the valve body flange. However, the slide lock plate could be attached above the bonnet plate, preferably as a single piece, with the guide screws mounted to the valve body flange and extending up through the bonnet plate. In this embodiment, the slide lock plate is removable with the bonnet plate. Thus, the slide lock plate can be coupled to either one of the bonnet plate and the valve body flange.

The slide lock assembly of the present invention has been described and illustrated for use with a gate valve, however, the slide lock assembly can be used with other types of vacuum valves, including rectangular or slot valves.

In addition, the terms "up" and "down" as used herein are relative terms depending on the mounting orientation of the valve gate and are used solely for clarity and understanding of the figures.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A vacuum valve comprising,
   a valve housing defining a valve chamber, the valve chamber having an opening therein for providing access to the vacuum chamber,
   a valve plate movable within the valve chamber from a first, open position away from the opening to a second, closed position wherein the valve plate closes the opening to the vacuum chamber,
   an actuator for moving the valve plate between its open and closed positions,
   the valve housing including a removable end plate to which the actuator and valve plate are secured, so that removal of the end plate in an upward direction separates the actuator and valve plate from the valve housing, the valve housing also including an end plate engaging member,
   a clamp mechanism coupled to one of the end plate and end plate engaging member, the clamp mechanism having a first position allowing separation of the end plate from the end plate engaging member and a second position that securely holds the end plate to the end plate engaging member in a sealed manner,
   the clamp mechanism being movable between its first and second positions in a direction transverse the direction of removal of the end plate.

2. The vacuum valve of claim 1 wherein,
   the clamp mechanism includes a lever that moves the clamp mechanism between its first and second positions.

3. The vacuum valve of claim 1 wherein, the clamp mechanism includes a series of guide screws mounted to one of the end plate and the end plate engaging member and extending through openings in the other of said end plate and end plate engaging member, and a slide plate that is movable in a plane transverse to the guide screws, the slide plate having a first position that permits separation of the end plate from the end plate engaging member and a second position that securely fastens the end plate to the end plate engaging member.

4. The vacuum valve of claim 3 wherein,
   the slide plate includes elongated openings, one for each guide screw, and a guide screw engaging protrusion, and at least one guide screw includes a shoulder adapted to engage a guide screw engaging protrusion when the slide plate is in a second position and thereby prevent movement of the guide screw in a direction along its central axis.

5. The vacuum valve of claim 4 wherein,
   the guide screw engaging protrusion includes a cam surface for progressively engaging the shoulder of the guide screw and clamping the end plate and end plate engaging member together.

6. The vacuum valve of claim 5 wherein,
   the slide plate is mounted on the valve housing in a manner permitting sliding movement of the slide plate between its first and second positions, and wherein the cam surface progressively engages the shoulder of the guide screw as the slide plate moves from its first position to its second position.

7. The vacuum valve of claim 6 wherein,
   the slide plate includes a releasable clamp lever that is movable between first and second positions in order to move the slide plate between its first and second positions.

8. The vacuum valve of claim 7 wherein,
   the releasable clamp lever includes an over-center hold down mechanism.

9. The vacuum valve of claim 7 wherein,
   the releasable clamp lever is pivotally mounted to pivot between its first and second positions.

10. The vacuum valve of claim 7 wherein,
    the slide plate is secured to the end plate engaging member by a means of an arm extending through an opening in the slide plate and coupled to the releasable clamp lever.

11. The vacuum valve of claim 4 wherein,
    the actuator includes a movable piston component that is connected at one end to the valve plate and a cylinder component connected to the valve housing, the piston component and the cylinder component defining first and second working chambers for moving the piston component a travel distance.

12. A vacuum valve comprising, a valve housing defining a valve chamber, the valve chamber having an opening therein for providing access to the vacuum chamber, a valve plate movable within the valve chamber from a first, open position away from the opening to a second, closed position wherein the valve plate closes the opening to the vacuum chamber, an actuator for moving the valve plate between its open and closed positions, the valve housing including a removable end plate to which the actuator and valve plate are secured, so that removal of the end plate in an outward direction separates the actuator and valve plate from the valve housing, the valve housing also including an end plate engaging member, a clamp mechanism coupled to one of the end plate and end plate engaging member, the clamp mechanism having a first position allowing separation of the end plate from the end plate engaging member and a second position that securely holds the end plate to the end plate engaging member in a sealed manner, the clamp mechanism being movable between its first and second positions in a direction transverse the direction of removal of the end plate, the clamp mechanism also including a cam surface for applying a clamping force on the end plate.

13. The vacuum valve of claim 12 wherein, the end plate includes guide members that extend through the end plate engaging member and are captured by the clamp mechanism.

14. The vacuum valve of claim 13 wherein, the cam surface of the clamp mechanism engages a headed end of a guide member and thereby pulls on the guide member.

15. The vacuum valve of claim 14 wherein, the clamp mechanism includes a slide lock plate having openings wherein the cam surface is defined.

16. The vacuum valve of claim 15 wherein, the slide lock plate is slidably carried on the valve housing.

\* \* \* \* \*